(12) United States Patent
Noy et al.

(10) Patent No.: US 6,539,540 B1
(45) Date of Patent: Mar. 25, 2003

(54) METHODS AND APPARATUS FOR OPTIMIZING SIMPLE NETWORK MANAGEMENT PROTOCOL (SNMP) REQUESTS

(75) Inventors: Ariel Noy, Herzlia (IL); Sharon Barkai, Shoam (IL); Zeev Vax, Tel Aviv (IL); Paul Hardak, Lod (IL)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/316,977

(22) Filed: May 24, 1999

(51) Int. Cl.[7] .................................................. G06F 9/45
(52) U.S. Cl. ........................................ 717/141; 709/223
(58) Field of Search ............................ 717/8, 141, 142, 717/143; 709/220, 223, 224, 236, 242, 246, 313, 232; 707/2, 10, 104.1, 103 R; 370/395.53, 248, 254, 385; 714/43

(56) References Cited

U.S. PATENT DOCUMENTS

| | | | | |
|---|---|---|---|---|
| 5,802,309 A | * | 9/1998 | Cook et al. ................ | 709/232 |
| 5,905,724 A | * | 5/1999 | Carson et al. ............... | 370/385 |
| 5,923,850 A | * | 7/1999 | Barroux ...................... | 709/224 |
| 5,926,462 A | * | 7/1999 | Schenkel et al. ........... | 370/254 |
| 5,978,845 A | * | 11/1999 | Reisacher ................... | 709/223 |
| 6,115,362 A | * | 9/2000 | Bosa et al. ................. | 370/248 |
| 6,122,639 A | * | 9/2000 | Babu et al. ................. | 707/103 |
| 6,154,458 A | * | 11/2000 | Kudoh et al. .......... | 370/395.53 |
| 6,219,705 B1 | * | 4/2001 | Steinberger et al. ........ | 709/224 |
| 6,220,768 B1 | * | 4/2001 | Barroux ...................... | 709/224 |
| 6,269,330 B1 | * | 7/2001 | Cidon et al. ................. | 704/43 |

* cited by examiner

Primary Examiner—Gregory Morse
Assistant Examiner—Hoang-Vu Antony Nguyen-Ba
(74) Attorney, Agent, or Firm—Howard Zaretsky, Esq.

(57) ABSTRACT

A method for optimizing the detection of a change in MIB information, the method including the steps of creating a MIB information request, sending the request to a SNMP agent, receiving a first response to the request from the SNMP agent, wherein the first response includes MIB information encoded as a byte array, and comparing the first response byte array to a comparison byte array to determine a difference therebetween.

17 Claims, 3 Drawing Sheets

METHODS AND APPARATUS FOR OPTIMIZING SIMPLE NETWORK MANAGEMENT PROTOCOL (SNMP) REQUESTS

FIELD OF THE INVENTION

The present invention relates to computer networks in general, and more particularly to methods and apparatus for optimizing Simple Network Management Protocol (SNMP) request.

BACKGROUND OF THE INVENTION

With the proliferation of local are networks (LANs), the need has developed for more powerful tools to manage LANs as they increase in complexity and size. One facility available for managing large networks is the Simple Network Management Protocol (SNMP). SNMP includes two main elements: managers and agents. The SNMP manager is the interface through which the network administrator performs network management functions. SNMP agents mediate between the network devices being managed, such as routers and switches, and the SNMP manager. Each agent maintains a management information base (MIB) that includes information regarding the network device. SNMP provides for a manager to receive MIB information from agents upon request by the manager or at the initiative of the agent, as the result of an SNMP trap, for example.

Often, an SNMP manager will periodically poll an agent in order to detect changes in the MIB information for a particular network device. This is currently accomplished by the SNMP manager creating a request message for specific MIB information each time it polls the agent and then sending the request to the agent. In response, the agent formats a response message that includes the requested MIB information and sends the response to the manager. The manager then deconstructs the response message to derive the MIB information and compares the information to previously acquired information or baseline information in order to detect any differences. However, where MIB information does not generally change from one polling to the next, such comparisons are relatively inefficient.

SUMMARY OF THE PRESENT INVENTION

The present invention seeks to provide novel methods and apparatus for optimizing Simple Network Management Protocol (SNMP) requests that provide a greater efficiency than is currently known in the art. A system is provided where a MIB information request is created once and sent multiple times to a switch. The switch response and baseline comparison information are related to as byte strings and compared as such. There is no need to derive the MIB information from the switch response for comparison with MIB information unless and until a byte-level difference is detected, thus conserving the processing resources otherwise needed for a comparison of MIB information.

There is thus provided in accordance with a preferred embodiment of the present invention a method for detecting a change in MIB information, the method including the steps of a) creating a MIB information request, b) sending the request to an SNMP agent, c) receiving a first response to the request from the SNMP agent, the first response includes MIB information encoded as a byte array, and d) comparing the first response byte array to a comparison byte array to determine a difference therebetween, thereby detecting.

Further in accordance with a preferred embodiment of the present invention the method further includes repeating steps b)–d) using the MIB information request created in step a).

Still further in accordance with a preferred embodiment of the present invention the method further includes using the first response byte array as the comparison byte array for a second response byte array received from the SNMP agent subsequent to the receipt of the first response.

There is also provided in accordance with a preferred embodiment of the present invention a system for detecting a change in MIB information including means for creating a MIB information request, means for sending the request to an SNMP agent, means for receiving a first response to the request from the SNMP agent, the first response includes MIB information encoded as a byte array, and means for comparing the first response byte array to a comparison byte array to determine a difference therebetween, thereby detecting.

Further in accordance with a preferred embodiment of the present invention the means for comparing uses the first response byte array as the comparison byte array for a second response byte array received from the SNMP agent subsequent to the receipt of the first response.

BRIEF DESCRIPTION OF THE DRAWINGS

The present invention will be understood and appreciated more fully from the following detailed description taken in conjunction with the appended drawings in which.

DETAILED DESCRIPTION OF THE PRESENT INVENTION

Figure 1:
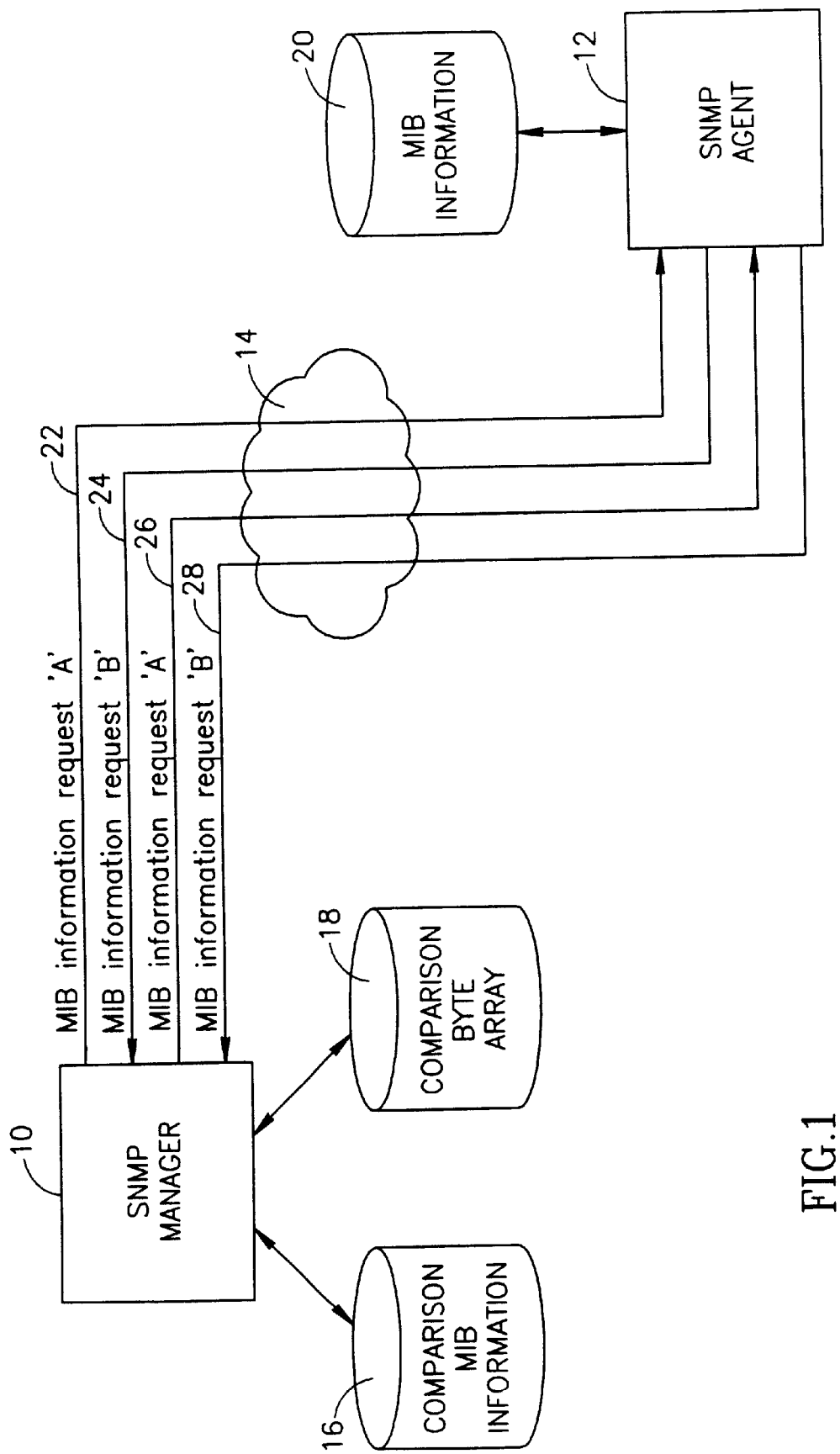
FIG. 1 is a simplified flow diagram illustration of an optimized SNMP MIB information polling system, constructed and operative in accordance with a preferred embodiment of the present invention.

Reference is now made to FIG. 1 which is a simplified flow diagram illustration of an optimized SNMP MIB information polling system, constructed and operative in accordance with a preferred embodiment of the present invention. In the system of FIG. 1, a SNMP manager 10 is shown in communication with a SNMP agent 12 via a network 14. Manager 10 preferably includes a database 16 of comparison MIB information and a database 18 of comparison byte array information. Agent 12 preferably includes a database 20 of MIB information.

Operation of the system of FIG. 1 begins with manager 10 creating a MIB information request 'A' and sending the request to agent 12 via network 14 as shown by arrow 22. Agent 12 receives the request, accesses the requested information from database 20, creates a MIB information response 'B' which includes the information, and sends the request to manager 10 via network 14 as shown by arrow 24. Response 'B' is typically formatted as a protocol data unit (PDU) comprising a byte array in accordance with the data transmission protocol of network 14. Manager 10 receives the response and compares the byte array received with a comparison byte array previously stored in database 18 and/or stores the byte array in database 18 for comparison with one or more subsequently received responses. The byte array comparison operation is described in greater detail hereinbelow with reference to FIGS. 2 and 3.

It is a particular feature of the present invention that the same MIB information request 'A' previously created and sent to agent 12 is subsequently resent to agent 12 one or more times as is shown by an arrow 26. In this manner a savings is realized as manager 10 does not recreate the MIB information request, but merely resends a request that has already been created. Should the MIB information in database 20 not have changed since the previous request was made, agent 12 responds exactly as before with MIB information response 'C' as is shown by an arrow 28, where the contents of response 'C' is the same as the previous response 'B'. Preferably, only where a response from agent 12 is not timely received is a new MIB information request created with a new request ID in order to avoid receipt of more than one response to request 'A'.

Figure 2:
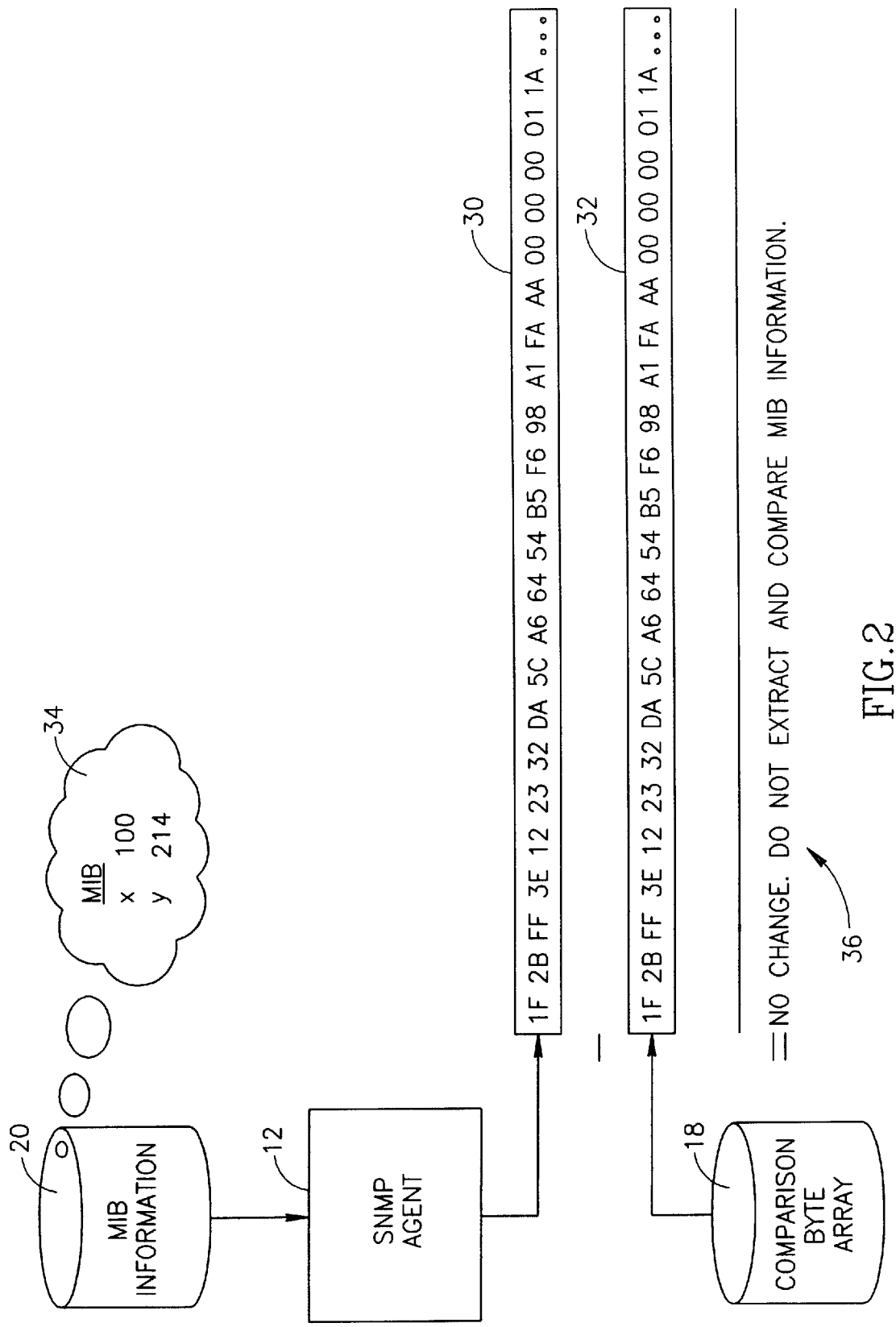
FIG. 2 is a simplified first flow diagram illustration of a first example outcome of a byte array comparison operation in the system of FIG. 1, operative in accordance with a preferred embodiment of the present invention.

Additional reference is now made to FIG. 2 which is a simplified flow diagram illustration of a first example byte array comparison operation in the system of FIG. 1, operative in accordance with a preferred embodiment of the present invention. MIB information response 'C' is shown as a byte array 30 in which MIB information such as that shown at reference numeral 34 is encoded. MIB information response 'B' or other comparison information is shown as byte array 32. The two byte arrays 30 and 32 are then compared by the manager using any conventional byte comparison means resulting in a comparison outcome such as that shown at reference numeral 36 in which no difference between the byte arrays are found, indication that the MIB information in database 20 has not changed.

Figure 3:
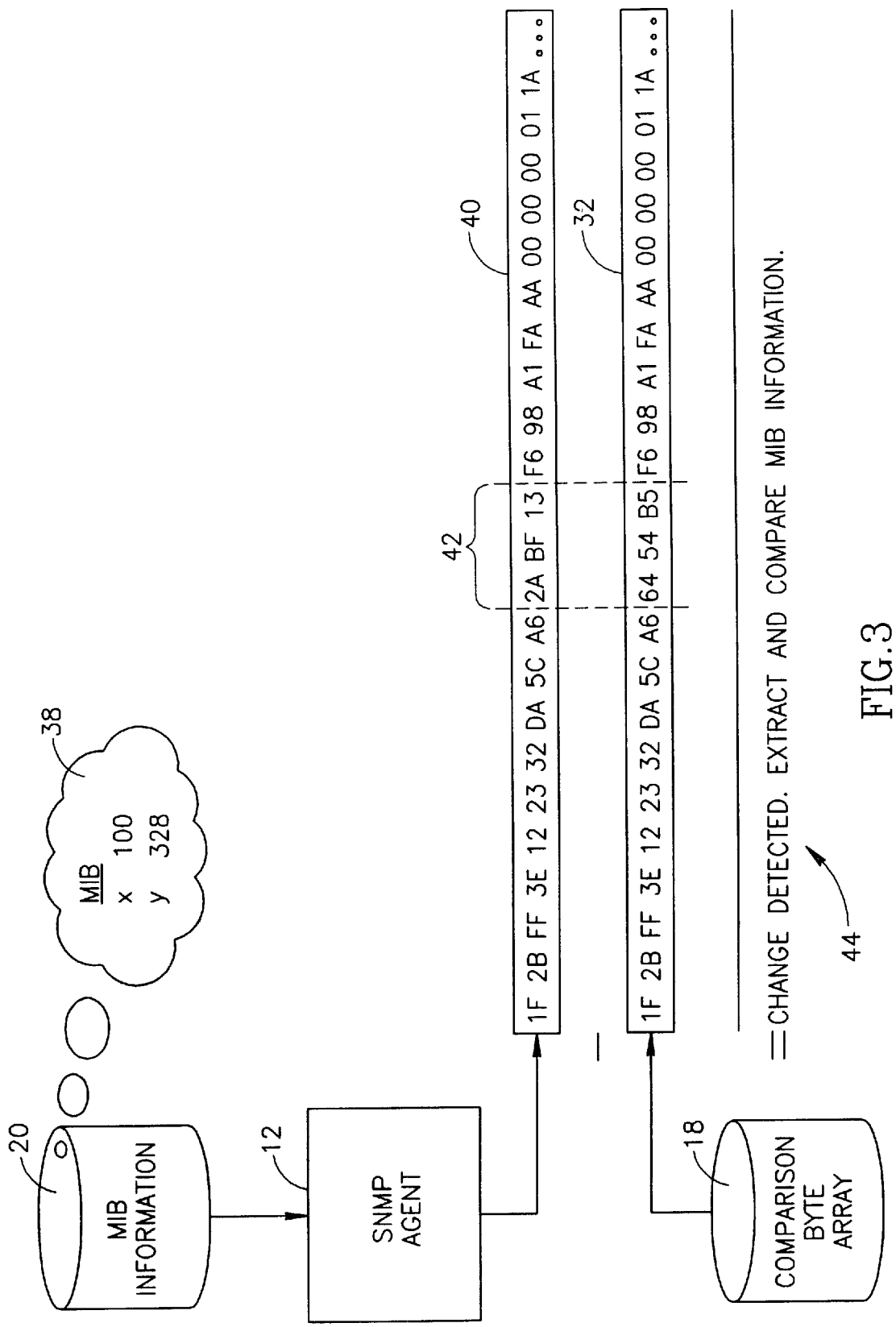
FIG. 3 is a simplified second flow diagram that illustrates a second example of a byte array comparison operation in the system of FIG. 1, operative in accordance with a preferred embodiment of the present invention.

Additional reference is now made of FIG. 3 which is a simplified flow diagram illustration of a second example byte array comparison operation in the system of FIG. 1, operative in accordance with a preferred embodiment of the present invention. The operation of FIG. 3 is similar to that of FIG. 2 with the notable exception that the MIB information shown at reference numeral 38 has changed relative to that of 34 (FIG. 2). MIB information response 'C' is shown as a byte array 40, and the change in MIB information is represented by differently encoded bytes at reference numeral 42. The two bytes array 40 and 32 are then compared by the manager as before resulting in a comparison outcome such as that shown at reference numeral 44 in which a difference between the two byte arrays is found, indicating that the MIB information in database 20 has changed. When such a result occurs, the MIB information encoded in byte array 40 must be extracted and compared with the comparison MIB information stored in database 16 (FIG. 1) in accordance with conventional techniques.

The methods and apparatus disclosed herein have been described without reference to specific hardware or software. Rather, the methods and apparatus have been described in a manner sufficient to enable persons of ordinary skills in the art to readily adapt commercially available hardware and software as may be needed to reduce any of the embodiments of the present invention to practice without undue experimentation and using conventional techniques.

While the present invention has been described with reference to a few specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

What is claimed is:

1. A method of detecting a change in Management Information Base (MIB) information received from a Simple Network Management Protocol (SNMP) agent over a network, the method comprising the steps of:
   generating a MIB information request;
   sending said MIB information request to an SNMP agent over said network;
   receiving a first response to said MIB information request from said SNMP agent, wherein said first response comprises MIB information encoded as a byte array, wherein said first response byte array is used as a baseline comparison byte array for response byte arrays received from said SNMP agent subsequent to the receipt of said first response;
   comparing on a binary level said first response byte array to said baseline comparison byte array to determine if said MIB information has changed; and
   if a change is detected, extracting MIB information from said first response byte array for comparison with baseline MIB information.

2. The method according to claim 1, further comprising repeating said steps of sending, receiving and comparing using said MIB information request created during said step of creating.

3. The method according to claim 1, wherein said MIB information request is created once and re-used each time it is to be sent to said SNMP agent.

4. The method according to claim 1, further comprising the step of, if a difference is not detected, conserving processing resources by not extracting MIB information from said response message and comparing to baseline comparison MIB information.

5. The method according to claim 1, wherein said baseline comparison information is generated from a first response received in response to a MIB information request.

6. The method according to claim 1, further comprising the step of storing a first response to said MIB information request as a byte array in a database for use as baseline comparison information in subsequent comparisons.

7. The method according to claim 1, wherein said response message comprises binary data encoded in Protocol Data Unit (PDU) in accordance with a transmission protocol of said network.

8. The method according to claim 1, wherein said SNMP agent sends the same response as previously sent if no change in MIB information has occurred since the previous request was received.

9. A system for detecting a change in Management Information Base (MIB) information comprising:
   means for generating a MIB information request;
   means for sending said MIB information request to a Simple Network Management Protocol (SNMP) agent over a network;
   means for receiving a first response to said MIB information request from said SNMP agent, wherein said first response comprises MIB information encoded as a byte array, wherein said first response byte array is used as a comparison byte array for response byte arrays received from said SNMP agent subsequent to the receipt of said first response; and
   means for comparing said first response byte array to said comparison byte array to determine whether a change in said response has occurred.

10. A method of detecting a change in Management Information Base (MIB) information received from a Simple Network Management Protocol (SNMP) agent over a network, the method comprising the steps of:

creating a MIB information request message;

sending said MIB information request message to an SNMP agent over said network;

receiving a first response message from said SNMP agent;

performing a binary comparison of said first response message to baseline comparison information wherein said first response byte array is used as said baseline comparison byte array for response byte arrays received from said SNMP agent subsequent to the receipt of said first response; and if a byte level difference is detected as a result of said comparison, extracting MIB information from said response message and comparing said extracted MIB information with said baseline comparison information.

11. The method according to claim 10, wherein said MIB information request is created once and re-used each time it is to be sent to said SNMP agent.

12. The method according to claim 10, wherein said binary comparison comprises comparing byte strings of said response message and said baseline comparison MIB comparison information.

13. The method according to claim 10, further comprising the step of, if a difference is not detected, conserving processing resources by not extracting MIB information from said response message and comparing to baseline comparison MIB information.

14. The method according to claim 10, wherein said baseline comparison information is generated from a first response received in response to a MIB information request.

15. The method according to claim 10, further comprising the step of storing a first response to said MIB information request as a byte array in a database for use as baseline comparison information in subsequent comparisons.

16. The method according to claim 10, wherein said response message comprises binary data encoded in Protocol Data Unit (PDU) in accordance with a transmission protocol of said network.

17. The method according to claim 10, wherein said SNMP agent sends the same response as previously sent if no change in MIB information has occurred since the previous request was received.

* * * * *